(12) United States Patent
Gindlesberger

(10) Patent No.: US 12,109,643 B2
(45) Date of Patent: Oct. 8, 2024

(54) ELECTRODE RE-CONDITIONING TOOL AND METHOD OF USING THE SAME

(71) Applicant: KTH PARTS INDUSTRIES, INC., St. Paris, OH (US)

(72) Inventor: Eric Gindlesberger, St. Paris, OH (US)

(73) Assignee: KTH PARTS INDUSTRIES, INC., St. Paris, OH (US)

( * ) Notice: Subject to any disclaimer, the term of this patent is extended or adjusted under 35 U.S.C. 154(b) by 527 days.

(21) Appl. No.: 16/980,216

(22) PCT Filed: Sep. 20, 2019

(86) PCT No.: PCT/US2019/052094
§ 371 (c)(1),
(2) Date: Sep. 11, 2020

(87) PCT Pub. No.: WO2020/068575
PCT Pub. Date: Apr. 2, 2020

(65) Prior Publication Data
US 2021/0213559 A1 Jul. 15, 2021

Related U.S. Application Data

(60) Provisional application No. 62/735,565, filed on Sep. 24, 2018.

(51) Int. Cl.
*B23K 11/36* (2006.01)
*B23K 11/11* (2006.01)

(52) U.S. Cl.
CPC ............. *B23K 11/36* (2013.01); *B23K 11/11* (2013.01)

(58) Field of Classification Search
CPC ....... B23K 11/36; B23K 11/11; B23K 11/115; B23K 11/185; B23K 11/3009; B23K 11/3063; B23K 35/0205; B23B 5/166
See application file for complete search history.

(56) References Cited

U.S. PATENT DOCUMENTS 5,304,769 A * 4/1994 Ikegami ............ B23K 11/3009
219/119
6,342,686 B1 1/2002 Farrow
(Continued)

FOREIGN PATENT DOCUMENTS

CN 104043898 9/2014
DE 102013224443 A1 9/2014
(Continued)

OTHER PUBLICATIONS

International Search Report and Written Opinion of the International Searching Authority (Form PCT/ISA/220); International Application No. PCT/US19/52094; Date of Mailing Dec. 13, 2019; Date of International Filing Sep. 20, 2019; 15 pages.
(Continued)

*Primary Examiner* — John P. Dulka
(74) *Attorney, Agent, or Firm* — Vorys, Sater, Seymour and Pease LLP; Rex W. Miller, II

(57) ABSTRACT

Texture for breaking oxide layers on an electrode and a tool applying texture to an electrode is disclosed. The tool may be used during a pattern creating process where the texture is applied to the electrode tip, or may be used during a re-conditioning process where a new texture is applied to a deteriorated electrode tip. The textured surface may include a pattern of raised or depressed features (teeth, knurls, protrusions, depressions, ridges, asperities, cross-hatches, parallel or non-parallel lines, star shapes, triangles, hexagons, etc.). The tool includes a plate having an upper side and a lower side, and a texture surface is arranged on one or both of the upper and lower sides of the tool. The tool's texture surface may include various asperities or patterns, which are imprinted onto the electrode tips by squeezing the electrodes against the upper and lower sides of the tool.

18 Claims, 7 Drawing Sheets

(56) References Cited

U.S. PATENT DOCUMENTS

| | | |
|---|---|---|
| 8,222,560 B2 | 7/2012 | Sigler et al. |
| 8,436,269 B2 | 5/2013 | Sigler et al. |
| 8,833,215 B2 | 9/2014 | Sigler et al. |
| 8,927,894 B2 | 1/2015 | Sigler et al. |
| 9,346,118 B2 | 5/2016 | Sigler et al. |
| 9,682,439 B2 | 6/2017 | Sigler et al. |
| 2003/0192863 A1 | 10/2003 | Wang et al. |
| 2005/0211677 A1* | 9/2005 | Chen ............... B23K 11/115 219/119 |
| 2011/0188952 A1 | 8/2011 | Sigler et al. |
| 2013/0200048 A1 | 8/2013 | Sigler et al. |
| 2015/0083694 A1 | 3/2015 | Sigler et al. |
| 2016/0039039 A1 | 2/2016 | Edwards, II et al. |
| 2017/0232547 A1 | 8/2017 | Chai et al. |

FOREIGN PATENT DOCUMENTS

| | | |
|---|---|---|
| JP | 2602530 B2 | 4/1997 |
| JP | 2617264 B2 | 6/1997 |
| JP | 2798825 B2 | 9/1998 |
| JP | 2820815 B2 | 11/1998 |
| JP | 2883216 B2 | 4/1999 |
| JP | 2000288744 | 10/2000 |

OTHER PUBLICATIONS

Hone Patent Investigation: RSW Electrode/Apply Date Dec. 27, 2017; pp. 4.

General Motors Research and Development (GM); GM Welding Breakthrough Enables More Use of Aluminum; http://media.gm.com/media/us/en/gm/home.detail.html/content/Pages/news/us/en/2012/Sep/0924_welding.html; Sep. 2017; 3 pages.

Timo Karhu, Valmet Automotive; Joining Technologies in Automotive Industry; Mar. 7, 2016; 9 pages.

Erik Tolf, KTH Royal Institute of Technology; Challenges in Resistance Welding of Ultra High Strength Steels; 2015; Stockholm, Sweden; 5 pages.

Euro Car Body 2015; 17th Global Car Body Benchmark Conference; Bad Nauheim, Germany; Oct. 20, 2015; 4 pages.

K-Group Technical Center; Sheet Metal Welding Conference XVI, Schoolcraft College, Detroit, MI; Oct. 21, 2014; 5 pages.

David R. Sigler, Blaire E. Carlson, Paul Janiak; Improving Aluminum Resistance Spot Welding in Automotive Structures; Welding Journal; Jun. 5, 2013; 9 pages.

* cited by examiner

ELECTRODE RE-CONDITIONING TOOL AND METHOD OF USING THE SAME

CROSS-REFERENCE TO RELATED APPLICATIONS

This application claims priority to and the benefit of U.S. Provisional Application No. 62/735,565 filed Sep. 24, 2018, and PCT/US2019/052094 filed Sep. 20, 2019, which are incorporated by reference herein in their entirety.

BACKGROUND

Resistance spot welding is a process in which contacting metal surface points of work-pieces are joined (i.e., welded together) by the heat obtained from resistance to an electrical current. In resistance spot welding, a pair of electrodes concentrate the electrical current into a spot while simultaneously clamping the workpieces together. The work-pieces may include metal sheets that, during the welding process, are held together under pressure exerted by the electrodes. Forcing the electrical current through the spot will melt the metal and typically form a molten nugget at the interface at the point of pressure after resolidification. This resolidified material helps to join the two materials together.

Resistance spot welding may be an economical and efficient joining process that is utilized in a number of applications, especially automated assembly line applications. It is the predominant joining process utilized by the automotive industry for assembling the automobile bodies and large components, and is also widely used in the manufacture of furniture and domestic equipment, etc. Resistance spot welding is efficient because it may produce a multitude of spot welds in a short period of time. For example, it permits the welding to occur at localized areas of the metal sheets without excessive heating of the remainder of the metal sheet. In some mass production applications, however, electrode life and equipment downtime to replace worn out electrodes is an important consideration.

In resistance spot welding there is electrical resistance between the electrode surface and the sheet metal. The magnitude of this resistance is impacted by the presence of a growing oxide layer on the workpiece (while welding materials such as aluminum) that, in turn, increases the contact resistance at the interface. This leads to increased heat generation and higher deterioration and wear of the electrode with time. Moreover, electrode resistance may require increased electrical current to achieve the desired nugget. The electrode resistance may therefore vary between welds depending on the amount of oxide present at different weld locations and because the electrode tips may continuously deteriorate after each successive weld, and these variations impact weld quality.

Some electrodes utilized in resistance spot welding applications include textured or roughened electrode tips. These textured or roughened electrode tips break through the oxide layer to make direct contact with the workpiece, and thereby reduce the electrode resistance. The textured or roughened electrode tips may be formed by grinding, or cutting asperities or different features, textures or shapes into the weld electrode tips, for example, by using a secondary cutter, an abrasive blaster, etc. These conventional texturing or roughening processes, however, are expensive, as utilizing additional equipment not only adds new machine and operational costs, but further increases the down time that the weld machine is off-line (i.e., not spot welding), which further impacts the cost per weld.

In addition, electrical current and metallurgical interactions between the electrode tips and the sheet metal will deteriorate the electrodes over time. In order to maintain a high quality of weld, a deteriorated electrode is either replaced with a new electrode or "dressed" by re-cutting the electrode tip. Both options are expensive and interrupt production by requiring the weld machine to be taken off-line for replacement or dressing of the electrode. In some applications, the electrode tips need to be dressed after only a few tens of welds, and electrode replacement may be cost prohibitive in such applications. Thus, electrode deterioration has a significant impact on the cost per weld, and advances and improvements to the methods and devices for resistance spot welding are continuously in demand to make the process more efficient and safe.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

Figure 1A:
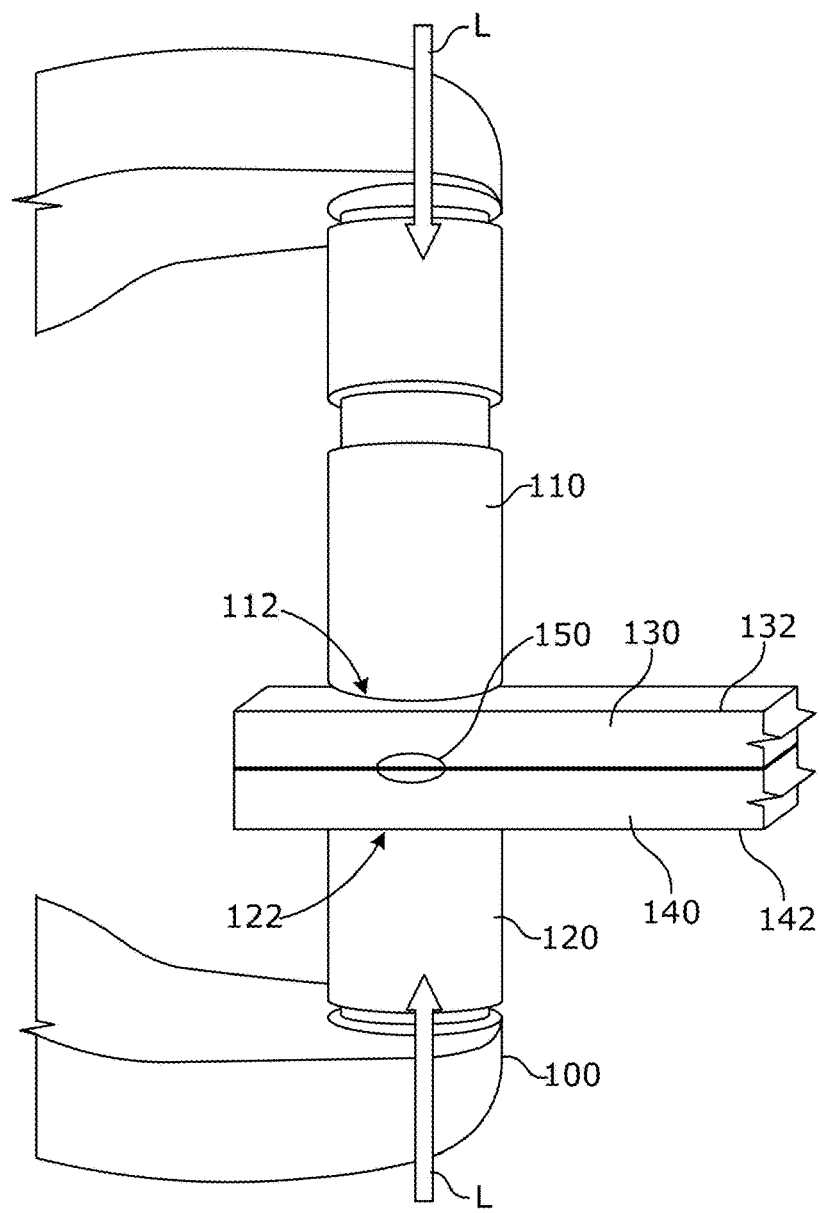
FIG. 1A is a side view of a welding machine during an example welding operation, in accordance with some or all of the principles of the present disclosure.

The present disclosure is related to resistance spot welding equipment and methods of use and, more particularly, to a textured surface on the weld electrode tip and a weld electrode tip re-conditioning tool for creating the textured surface of the electrode tip and a method of using the same.

Embodiments discussed herein describe improvements to tools for dressing electrode tips of welding machines. Some tool embodiments described herein include a body having an upper and lower tool surface, with a textured region or surface arranged on at least the upper or lower tool surface. The textured surface on either or both of the upper and lower tool surface may have a texture including a plurality of asperities, a pattern of knurls, or other features. In example operation, the tool is placed between the electrode tips, with each electrode tip being oriented or aligned proximate to the textured surfaces of the tool, and the welding machine is actuated to press or squeeze the electrode tips into the respective textured surface, which displaces or dislodges material on the electrode tips and imprints the texture of the tool onto the same.

Embodiments disclosed herein also describe methods of using the tool to add texture to the electrode tips. Some embodiments describe methods of dressing the electrode tips. Such methods may include pressing the electrode tips against the textured surfaces of the upper and lower tool surfaces to imprint the texture of the textured surface onto the electrode tips. Other embodiments describe a method for re-conditioning an electrode. Such other embodiments may include shaping the electrode tips to present new electrode tips having unworn electrode material and then pressing the new electrode tips against the textured surfaces of the upper and lower tool surfaces to imprint the texture of the textured surface onto the new electrode tips.

The presently disclosed embodiments provide concentrated pressure points, which assists in mechanically breaking through the oxide layer and reducing the electrode resistance between the electrode tips and the workpiece surface. The pattern or texture imprinted onto the electrode tips helps to minimize the stresses on the electrodes by lowering the electrode resistance and thus minimizing the heat generated at the interface. This in turn will reduce the electrode tip dressing frequency, extend the life of the electrode tips, save time that may otherwise be spent dressing the electrode tips, and save cost that may otherwise be spent when frequently replacing the weld electrodes. In addition, the presently disclosed embodiments may be utilized to join two or more work pieces of the same material and/or different materials. In dissimilar material joining applications, the presently disclosed embodiments may also have an impact on the joint quality (in addition to the benefits discussed earlier), for example, by reducing the electrode tip dressing frequency, extending the life of the electrode tips, saving time that may otherwise be spent dressing the electrode tips, and saving cost that may otherwise be spent when frequently replacing the weld electrodes.

In contrast to conventional spot welding tools and methods, the presently disclosed embodiments may imprint the pattern or texture into the electrode tips by using the force of a weld machine (e.g., via a servo motor, a pneumatic actuator, etc. thereof) to squeeze the pattern into the surfaces of the electrode tips. Utilizing the weld machine in this manner preempts the need to utilize additional equipment and reduces down time of the weld machine. In addition, the presently disclosed embodiments squeeze patterns into the surfaces of the electrode tips that are not deep enough (as compared to existing market solutions) to leave behind a significant indent in the weld nugget, which may be unacceptable under the applicable weld standards of a given project as indents may act as crack initiation points that may lead to joint failure. Furthermore, the presently disclosed embodiments form a nugget that has uniform material flow and meets the strength and internal quality requirements for a given project. The concentrated contact points in the presently disclosed embodiments mechanically break the oxide layer on the metal sheet surface, which thereby allows the electric current to flow evenly through the material, provides a more consistent weld nugget (wherever applicable), and improves electrode tip life. Also, breaking of the oxide layer reduces the heat generated at the surface which in turn reduces electrode tip wear and extends electrode life.

FIG. 1A illustrates an exemplary welding machine 100 according to the present subject matter. The welding machine 100 may include various types of robotic or non-robotic welding apparatuses, and may generally include any type of welder capable to provide the minimum squeeze pressure needed to apply the pattern to a desirable depth on the electrode tips. In some examples, the welding machine 100 is a servo-driven welder, whereas in other examples the welding machine 100 is a pneumatic-driven welder; however, other types of welders as known in the art may be utilized without departing from the present disclosure.

As illustrated, the welding machine 100 includes an upper electrode 110 having an upper electrode tip 112 and a lower electrode 120 having a lower electrode tip 122. The upper and lower electrode tips 112, 122 are the weld surfaces of the upper and lower electrodes 110, 120, respectively, that make contact with metal sheets or other workpieces that are to be joined as hereinafter described. Here, the upper and lower electrodes 110, 120 are each illustrated as a cylindrical shaped body with uniform radius and a circular shaped end or face that define the electrode tips 112, 122. As shown, the electrode tips 112, 122 are circular weld surfaces defined by the radius of the circular shaped face of the upper and lower electrodes 110, 120. In the illustrated embodiment, the upper and lower electrodes 110, 120 are cylindrical shaped, but in other embodiments, the electrodes 110, 120 could be comprised of any other shape or combination of shapes as well. Similarly, in the illustrated embodiment, the electrode tips 112, 122 are flat weld surfaces, but in other embodiments, the electrode tips 112, 122 may be provided with inward or outward protruding curvatures or patterns.

Either or both of the upper and lower electrodes 110, 120 may include various other geometries. For example, either or both of the upper and lower electrodes 110, 120 may each be a frusto-conical shaped body such that the electrode tips 112, 122 are circular weld surfaces on truncated ends of the frusto-conical shaped body and defined by a truncated end radius of the truncated ends. In even other embodiments, geometry of the upper electrode 110 is different than the geometry of the lower electrode 120. The upper and lower electrodes 110, 120 may include even different geometries, however, without departing from the present disclosure. Regardless of the geometry of the electrodes 110, 120 and the shapes of the weld surfaces defined by the electrode tips 112, 122, the electrode tips 112, 122 may be provided as flat weld surfaces or with inward or outward protruding curvatures, without departing from the present disclosure. In some examples, the upper and lower electrode tips 112, 122 may have same or different face diameters and radii of curvature. In some examples, the upper and lower electrode tips 112, 122 may be concave in nature as well.

Figure 1B:
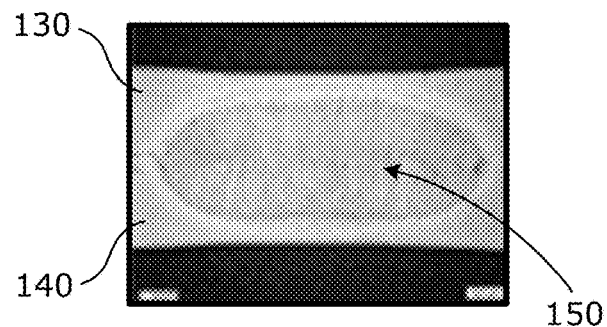
FIG. 1B is an optical microscope image taken at a cross-section of the metal sheets illustrating formation of a weld nugget.

During an exemplary spot welding operation, the upper electrode tip 112 of the upper electrode 110 is pressed against an upper metal part 130 with an appropriate load L, while the lower electrode tip 122 of the lower electrode 120 is pressed (simultaneously with the upper electrode 110) against a lower metal part 140 with the appropriate load L (simultaneously with the upper electrode tip 112). As illustrated, the upper and lower electrode tips 112, 122 simultaneously contact an outer surface 132 of the upper metal part 130 and an outer surface 142 of the lower metal part 140, respectively. The welding machine 100 then passes adequate electrical current between the upper and lower electrodes 110, 120 and across the interface of upper and lower metal parts 130, 140 to create a weld nugget (see FIG. 1B) after melting and re-solidification. While the weld nugget is formed at a location interior of the upper and lower metal parts 130, 140 and, therefore, obscured from view in FIG. 1A, a weld nugget region 150 is identified on FIG. 1A to illustrate from the exterior of the upper and lower metal parts 130, 140 about where the nugget would be formed within them. FIG. 1B is an optical microscope image at the cross-section illustrating formation of the weld nugget 150 within the upper and lower metal parts 130, 140 at a location therein that corresponds with the weld nugget region 150 of FIG. 1A. Though, there could be some applications where a traditional weld nugget is not formed and the bonding mechanism joining the upper and lower metal parts 130, 140 could be something different. The upper and lower electrode tips 112, 122 may have a specified hardness and contour that are designed for a particular welding application.

Oxide layers may form on the upper and lower metal parts 130, 140 in response to being pressed between the upper and lower electrodes 110, 112. Thus, either or both of the upper and lower electrode tips 112, 122 may include a textured or roughened weld surface (see FIG. 5) to penetrate an oxide layer on the outer surfaces 132, 142 of the upper and lower metal parts 130, 140. The textured or roughened surface may include multiple features that may be sharp enough to mechanically break through the oxide layer so as to reduce the electrode resistance by creating more contact points for current flow between the upper and lower electrodes 110, 120 and the upper and lower metal parts 130, 140. The textured or roughened surface also significantly drops the heat density by distributing the electrical energy across the outer surfaces 132, 142 of the metal parts 130, 140 and thus lowering the surface temperature of the same. In addition, the textured or roughened surface may provide a mechanical interference between the upper and lower electrodes 110, 120 and the upper and lower metal parts 130, 140 to eliminate or reduce unintended relative movement of the electrode tips 112, 122 on the outer surfaces 132, 142 of the metal parts 130, 140 (i.e., electrode skidding). The textured or roughened surface applied to the upper and lower electrode tips 112, 122 may deteriorate after a number of welds, and necessitate periodic re-conditioning of the upper and lower electrode tips 112, 122 as described below.

Figure 2A:
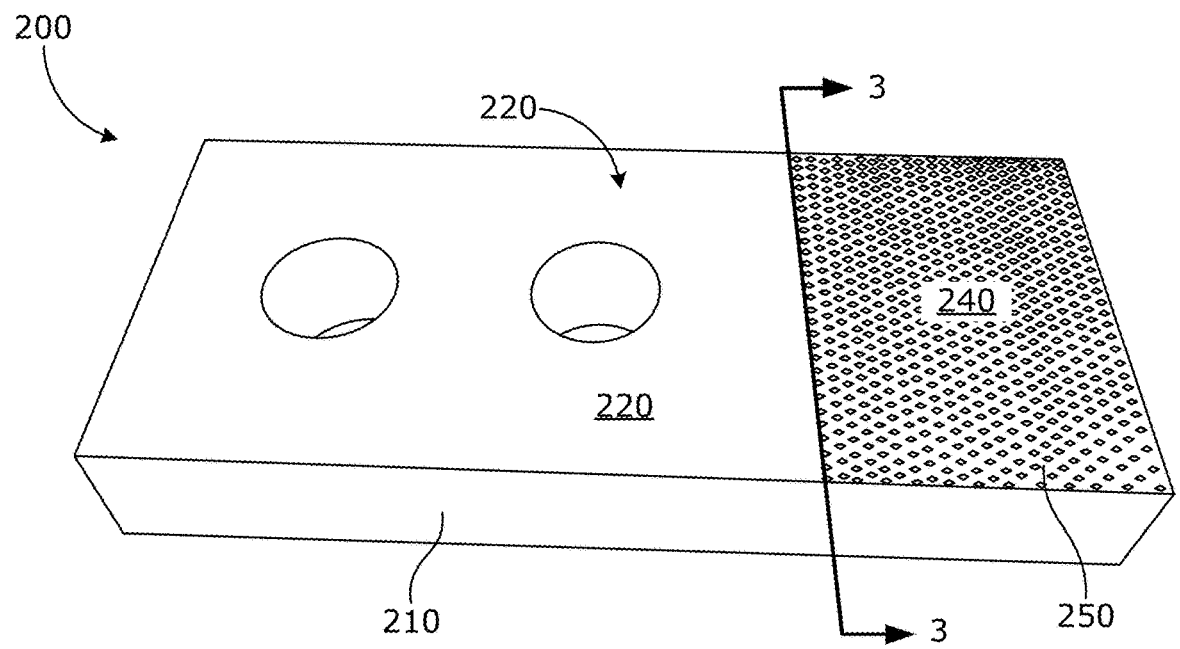
FIGS. 2A-2B are isometric top views of example tools that may be utilized to roughen or recondition the electrodes of a welding machine in accordance with the present subject matter.
Figure 2B:
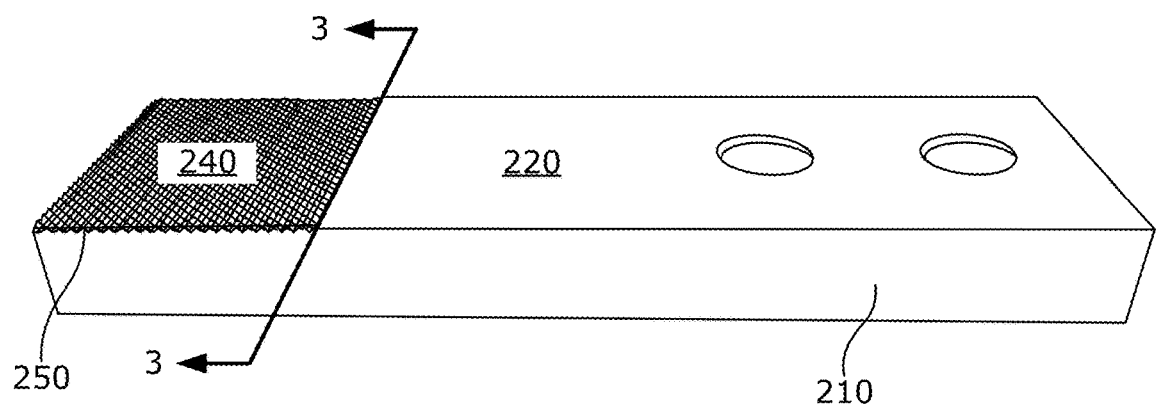
Figure 3:
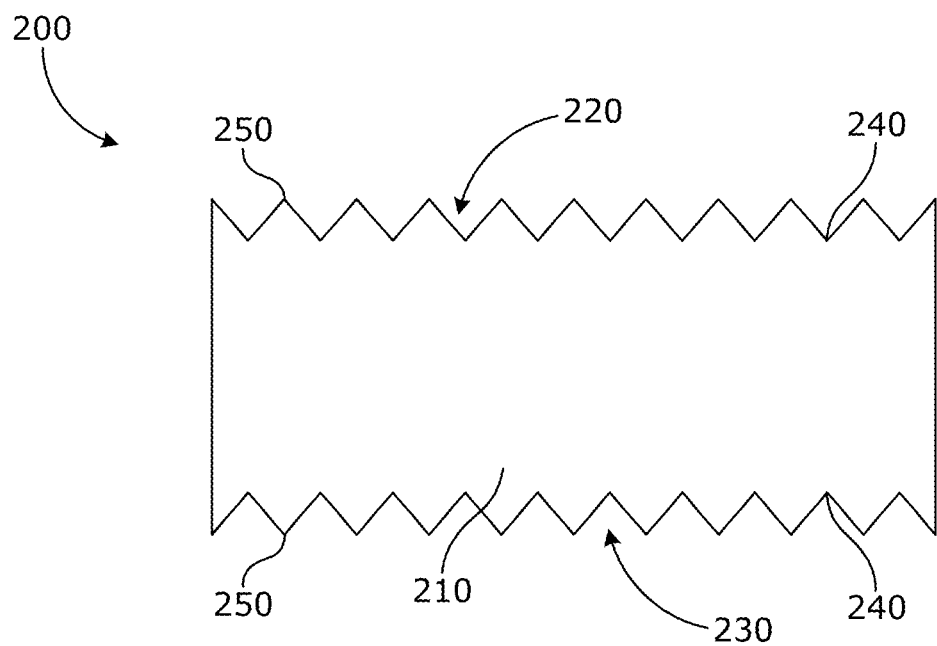
FIG. 3 illustrates an exemplary cross-sectional side view of the tool of FIGS. 2A-2B along section line 3-3.

FIGS. 2A, 2B, and 3 illustrate exemplary squeeze blocks or tools 200 (hereinafter, the tool 200) according to one or more embodiments of the present disclosure. In particular, FIGS. 2A-2B illustrate isometric top views of two different exemplary configurations of the tool 200, whereas FIG. 3 illustrates a side cross section of the tool 200 along section line 3-3 in FIGS. 2A-2B. As described below, the tool 200 may be utilized to roughen or texturize the weld surfaces of the electrode tips 112, 122, and to re-condition the same following a number of welds as needed.

The tool 200 is made from a plate 210 having an upper surface 220 and a lower surface 230 (see FIG. 3). The tool 200 may also include a rough texture or pattern of asperities formed on either or both of the upper surface 220 and the lower surface 230, depending on whether the tool 200 is to be utilized to texture or roughen one of the electrodes 110, 120 or both of the electrodes 110, 120. In the illustrated embodiment, the upper and lower surfaces 220, 230 of the tool 200 each include a textured surface 240. In this manner, the upper and lower electrode tips 112, 122 may be simultaneously textured or roughened. The textured surface 240 may alternatively be provided on either the upper surface 220 or the lower surface 230 such that the tool 200 includes a single texture or pattern of asperities.

The textured surface 240 may have various configurations, and may be applied to electrodes of any dimension. For example, the textured surface 240 may include a pattern 250 of male (raised) or female (depressed) features, and the features may include without limitation, teeth, knurls, protrusions, depressions, ridges, asperities, "cross-hatches," parallel or non-parallel lines, star shapes, triangles, hexagons, etc. Thus, the pattern 250 may include various textures or features having lines and/or various geometric shapes, being of male or female orientation, arranged in parallel or non-parallel, concentric or non-concentric, and/or overlapping or non-overlapping configurations. In the illustrated embodiment, the pattern 250 includes a plurality of protruding or depressed pyramids as illustrated in FIG. 3. However, the pattern 250 may be differently configured. For example, the pattern 250 may include more or less teeth that are arranged in the same or different orientation. In addition, the pattern 250 may be symmetrical or asymmetrical. Moreover, the pattern 250 may be non-randomly distributed on the textured surface 240 or may instead be randomly distributed on the textured surface 240. As will be appreciated, the textured surface 240 and the pattern 250 thereon of the tool 200 may be formed via various processes without departing from the present disclosure. For example, the textured surface 240 and the pattern 250 may be formed via squeezing, machining, pressing, forming, knurling, stamping, etching, forging, cutting, rolling, or other imprinting processes as known in the art.

Regardless of the configuration of the textured surface 240, the pattern 250 may be provided with an average roughness height (or depth) that is capable of mechanically breaking the oxide layer on the material surface. In addition, the pattern 250 may be provided with a hardness that is greater than the hardness of the electrodes 110, 120 and, specifically, greater than the hardness of the electrode tips 112, 122. In one embodiment, the tool 200 is made of a hardened tool steel and the electrode tips 112, 122 are made from a copper alloy; however, the tool 200 may be made from various other materials depending on the application and/or the material of the electrode tips 112, 122. Generally, the tool 200 may be made from any material that is hard enough to create a pattern on the electrode surface. Moreover, it should be appreciated that the tool 200 may have various thicknesses without departing from the present disclosure. For example, the tool 200 illustrated in FIGS. 2A-2B may have a thickness of 12 millimeters However, the tool 200 may have other thicknesses without departing from the present disclosure.

Figure 4:
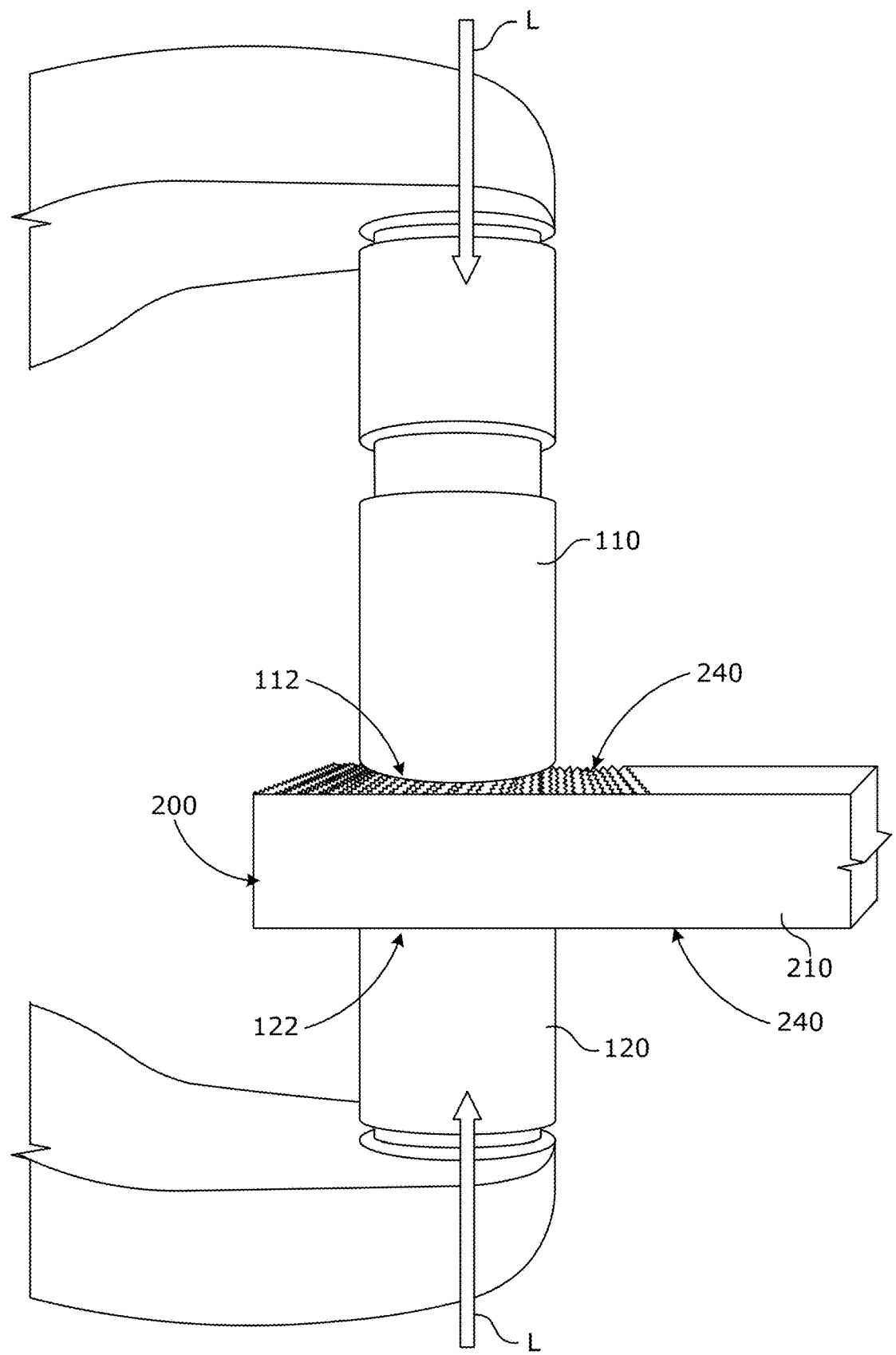
FIG. 4 is a side view of the welding machine of FIG. 1A and the tool of FIGS. 2-3 during an example roughening or reconditioning operation, according to the present subject matter.

Various processes may be utilized to imprint the textured surface 240, regardless of its configuration, onto the surfaces of the electrode tips 112, 122. FIG. 4 illustrates an exemplary embodiment where the textured surfaces 240 of the tool 200 are imprinted on the electrode tips 112, 122 as the welding machine 100 "squeezes" the tool 200 in between the upper and lower electrodes 110, 120, respectively. In particular, the electrode tips 112, 122 are located proximate to the textured surface 240 on the upper and lower sides 220, 230, respectively, and the welding machine 100 presses (with a load L) the upper and lower electrodes 110, 120 into the (respective) textured surface 240 of the tool 200. The load L may be applied on the upper and lower electrodes 110, 120 by the servo motor of the weld machine 100 or any other mechanism that actuates the electrodes 110, 120 during a welding process, but the load L may be differently applied without departing from the present disclosure. In this manner and without being bound by theory, compression of the tool 200, which is made from a material that is harder than the material of the electrode tips 112, 122, causes the asperities of the textured surface 240 (e.g., the pattern 250 of FIG. 3) to be imprinted into the electrode tips 112, 122, thereby producing an impression thereon that mirrors the textured surface 240. Thus, the textured surface 240 having the pattern 250 arranged in a male configuration will upset the electrode tips 112, 122 by displacing material thereon to form an impression that is a pattern of a plurality of female patterns that "mirrors" the textured surface 240 of the tool 200. As will be appreciated, the textured surface could possibly have any shape other than the one shown in FIG. 3. As used herein, the term mirror refers to a first image or object being a faithful representation of a second image or object, where the first image or object is identical in form to the second, but with the structure reversed, as in a mirror.

As illustrated in FIG. 4, the electrode tips 112, 122 may be textured simultaneously and without having to remove the upper and lower electrodes 110, 120 from the welding machine 100. Accordingly, the tool 200 may be appropriately sized to access the upper and lower electrode tips 112, 122 without removing the upper and lower electrodes 110, 120 from the welding machine 100. In other embodiments, however, the tool 200 may be utilized to texture either or both of the electrodes 110, 120, that have been removed from the welding machine 100, simultaneously or one at a time. Moreover, the tool 200 may be used by an operator for manual texturing of the electrode tips 112, 122, or the tool 200 may be used in a robotic spot welding application for automatic roughening or texturing of the electrode tips 112, 122.

In a robotic spot welding application, the upper and lower electrodes 110, 120 are brought to the tool 200 and the texturing of the electrode tips 112 and 122 may be performed in the same manner as described above. Also in these embodiments, the tool 200 may be located proximate to the welding machine 200 such that the welding machine 200 may move the upper and lower electrodes 110, 120 into engagement with the tool 200 after performing a number of welds, as needed. In one example where the welding machine 100 is a robotic welding machine (not illustrated) disposed within a cell of an assembly line, the tool 200 may be secured at a location within the cell (e.g., clamped to a table or other structure) that is within reach of a robotic arm (not illustrated) of the welding machine 200 that supports the upper and lower electrodes 110, 120. In this example, the welding machine 200 may first articulate the robotic arm, and the upper and lower electrodes 110, 120 coupled thereto, into a position where the upper and lower electrode tips 112, 122 are located proximate to the upper and lower surfaces 220, 230 of the tool 200, respectively, and the textured surfaces 240 formed thereon. The welding machine 200 may then be actuated to add texture to the electrode tips 112, 122, for example, by applying the load L on the upper and lower electrodes 110, 120 (e.g., via actuation of its servo motor) to drive them towards the upper and lower surfaces 220, 230 of the tool 200, respectively; and then compressing the tool 200 between the upper and lower electrodes 110, 120, such that the textured surfaces 240 are imprinted (or "squeezed") onto the electrode tips 112, 122. Once the electrode tips 112, 122 have been textured, the pressing action of the welding machine 100 is reversed and the tool 200 is removed from between the upper and lower electrodes 110, 120. A stop surface (not illustrated) may be used in lieu of the lower electrode 120 if only the upper electrode 110 needs texturing, and vice-versa.

Figure 5A:
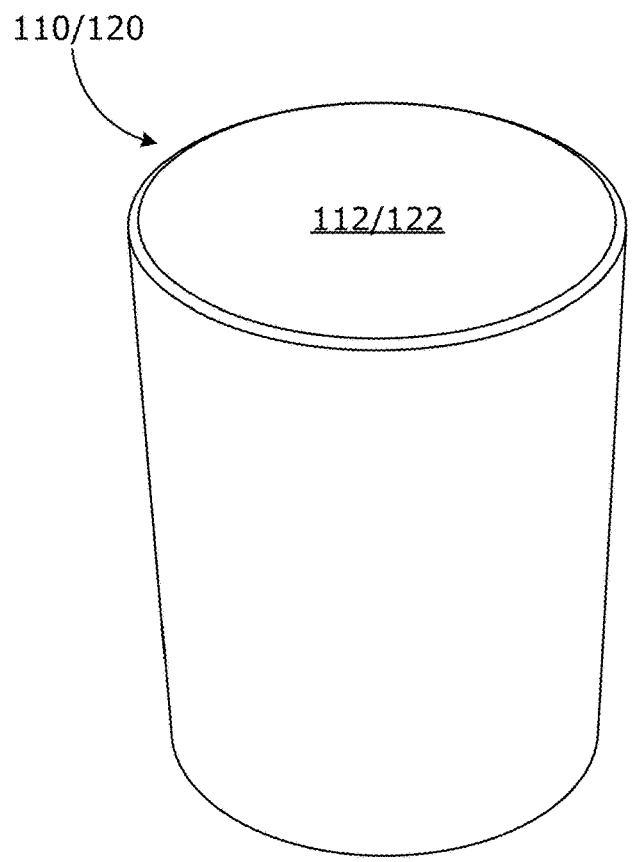
FIG. 5A is an isometric view of an exemplary electrode with a smooth tip that may be textured as illustrated in FIG. 4.
Figure 5B:
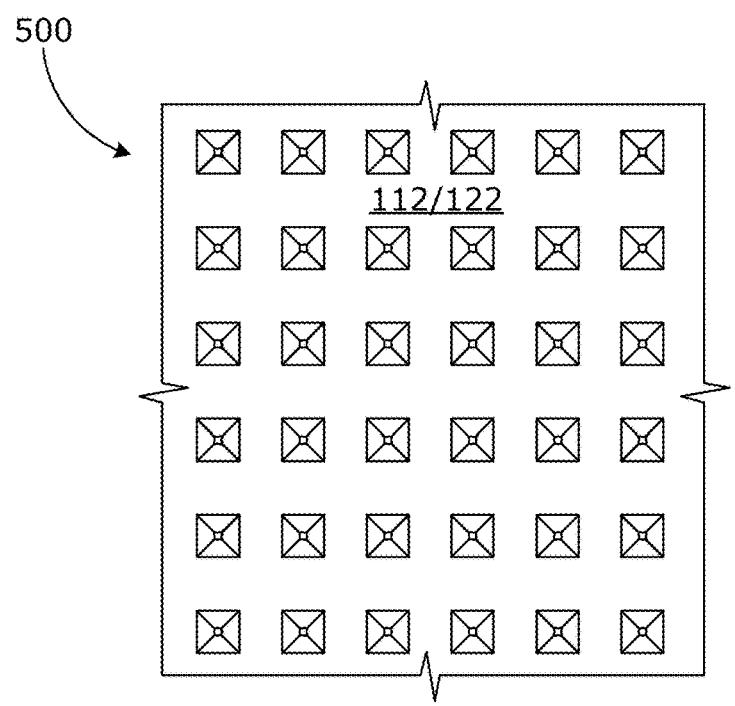
FIG. 5B is an isometric view of the electrode of FIG. 5A after an exemplary electrode texture has been imprinted onto the tip thereof as illustrated in FIG. 4 and which may be utilized in a welding operation illustrated in FIG. 1A.

As shown in FIG. 5A, the upper or lower electrode 110, 120 may be textured with the tool 200 described herein. The upper or lower electrode tip 112, 122 of the upper or lower electrode 110, 120 illustrated in FIG. 5A is smooth and does not include a texture. FIG. 5B illustrates an exemplary electrode texture 500 that may be squeezed onto the electrode tips 112, 122 of FIG. 5A, according to one or more embodiments disclosed herein. FIG. 5B illustrates an example where the texture 500 includes a plurality of pyramid protrusions. The texture 500, however, may be configured differently and include different features or patterns depending on the arrangement of asperities on the textured surface 240 of the tool 200. As discussed with reference to FIGS. 3-4, a welder or machine operator may utilize the tool 200 to imprint the texture 500 onto the upper electrode tip 112 and/or the lower electrode tip 122 by placing the tool 200 there-between, and then pressing or "squeezing" the upper and lower electrodes 110, 120 against the textured surface 240 of the tool 200 with sufficient force (e.g., the load L) to displace the material on the electrode tips 112, 122 and thereby create a texture thereon.

Figure 6:
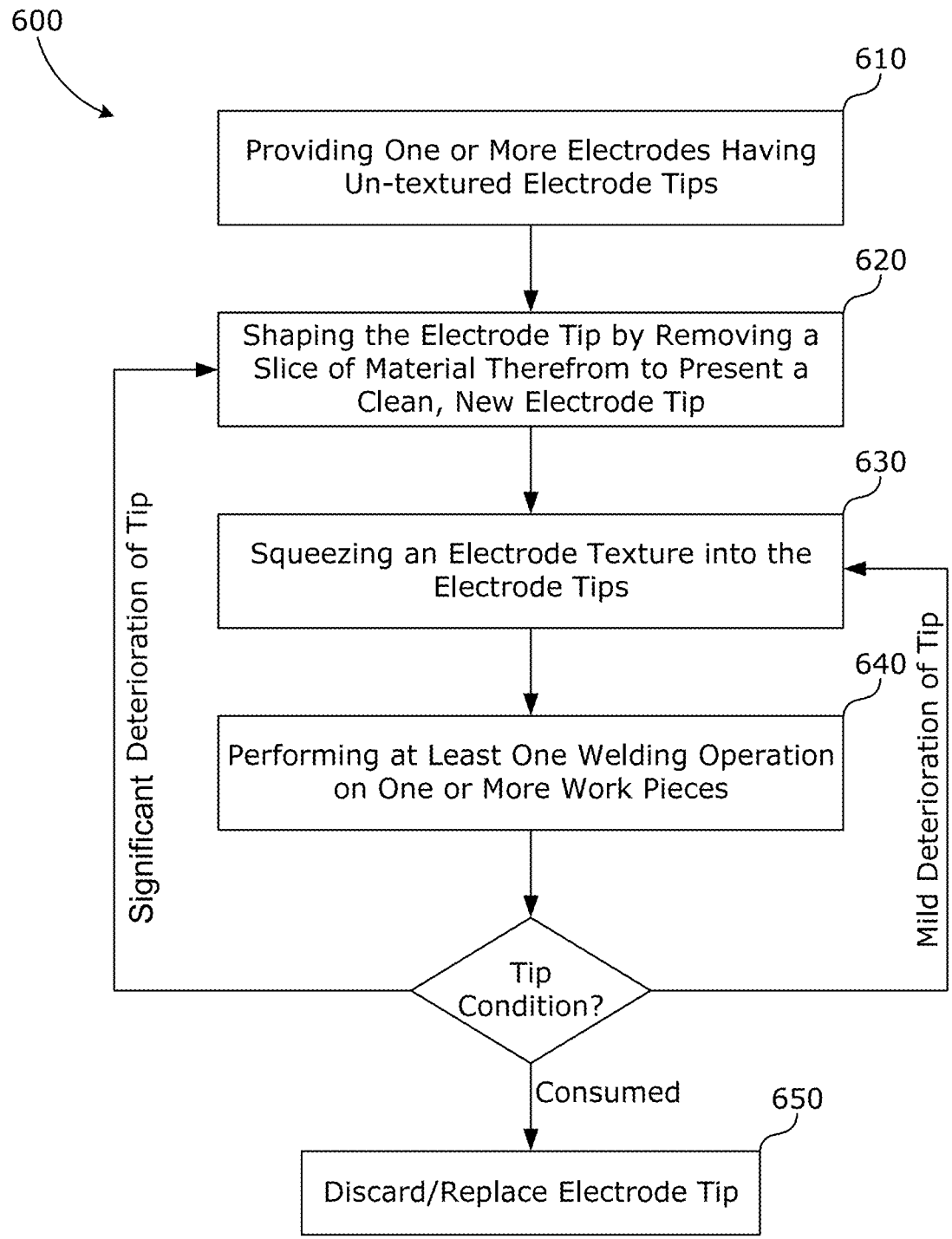
FIG. 6 is a flow chart of an example method for forming an electrode texture in the electrode tips, which may incorporate some or all of the principles of the present disclosure.
Figure 7:
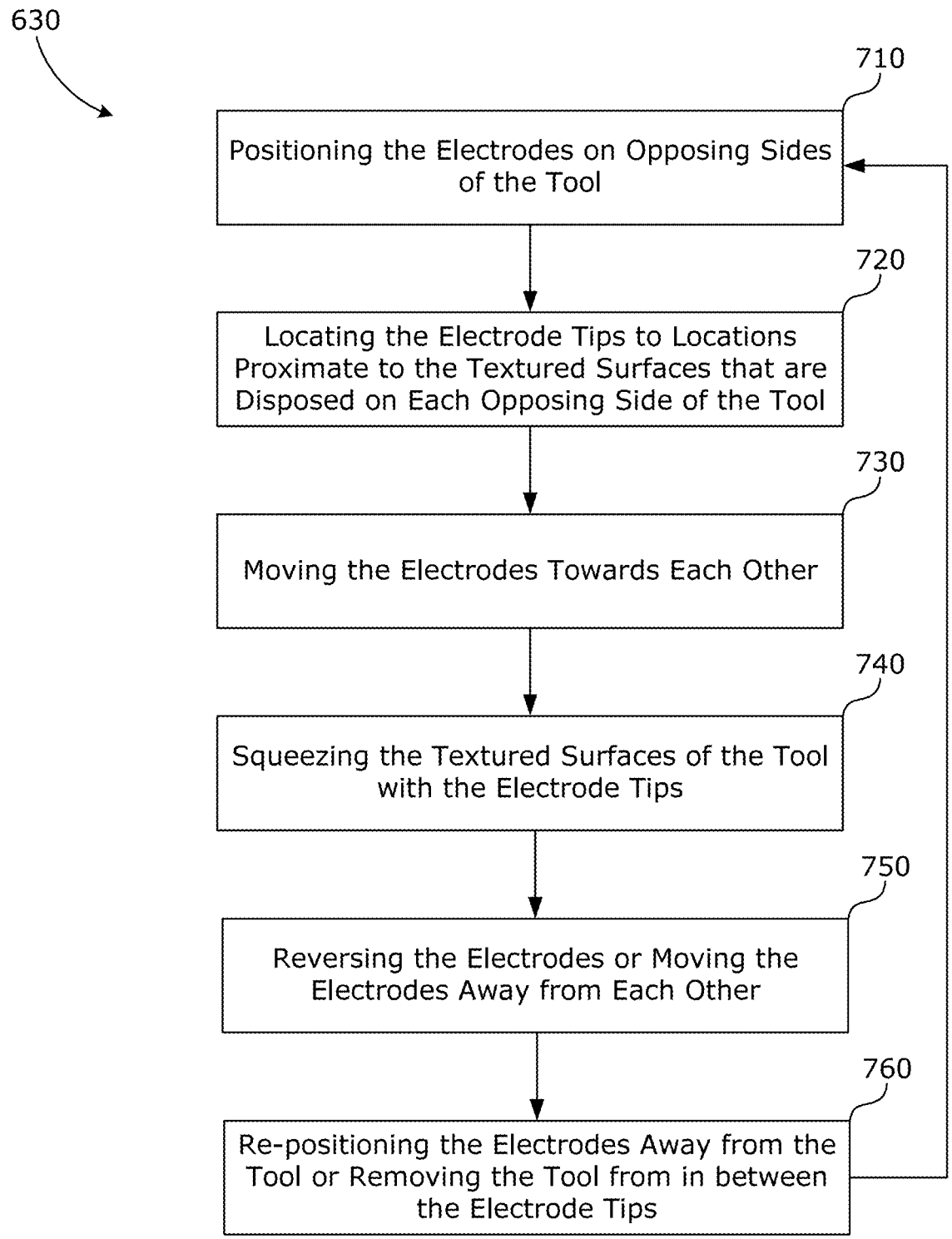
FIG. 7 is a flow chart illustrating a method according to FIG. 6, according to the present subject matter.

FIGS. 6-7 are diagrams representing various methods that may be utilized to add a texture (e.g., the electrode texture 500) to one or more electrode tips (e.g., the electrode tips 112, 122), according to one or more embodiments.

In particular, FIG. 6 is a flow chart of a texturing method 600 and illustrates the steps utilized to apply a texture on an electrode tip, according to one or more embodiments. Here, the texturing method 600 includes a first step of providing one or more electrodes having un-textured electrode tips (610). Then, the texturing method 600 includes a second step of shaping the electrode tips (620) followed by a third step of squeezing an electrode texture into the electrode tips (630). Once the electrode texture has been squeezed into the electrode tips, an optional fourth step includes performing at least one welding operation on one or more work pieces (640). Thus, the texturing method 600 may include the following steps: providing un-textured electrodes 610, shaping electrode tips 620, squeezing electrode textures into the tips of the un-textured electrodes 630, and then welding one or more work pieces 640 with the textured electrodes. Use of the electrodes during one or more welding operations will result in wear and deterioration of the electrode tips, including the buildup or accumulation of residue (e.g., oxide layers) on the electrode tips. If the electrode tips exhibit severe deterioration or wear after use, the electrode tips may be shaped to remove layer of worn material (620), a texture may be squeezed into the electrode tips (630), and then one or more welds may be performed (640). If the electrode tips exhibit mild deterioration or wear after use, a texture may be squeezed into the electrode tips (630), without shaping (620), and then one or more welds may be performed (640).

In this example, the texturing method 600 is described with reference to un-textured electrode tips. Such un-textured electrode tips may comprise new electrode tips without any prior texturing, or such un-textured electrode tips may comprise used electrode tips that may have been previously textured. For example, the un-textured electrode tips may have been previously textured and then used, but such subsequent use has deteriorated and/or worn the electrode tip enough to cover, mask, or otherwise effectively eliminate the appearance and/or function of any previously formed texture or pressure points. Thus, the second step of shaping the electrode tips 620 may be performed on worn and/or deteriorated electrode tips, whereby a slice of material (e.g., a slice of material encompassing deterioration and/or wear) is removed from the distal end of the electrode tip to present a clean electrode tip. Because this clean electrode tip is formed from material that was previously unexposed during welding operations (i.e., covered by the slice of material removed during the shaping step 620), it may exhibit little to no deterioration or wear. In other examples, however, the shaping step 620 may be skipped such that the third step of squeezing electrode texture into the electrode tips 630 is performed on electrode tips that have not be subjected to any immediately preceding material removal operations to present clean, new material at the electrode tip. For example, the second step of shaping the electrode tips 620 may be skipped in instances where the electrode tips provided during the first step 610 are brand new.

The squeezing step 630 (i.e., the third step) of the texturing method 600 may further include several sub-steps, as described above with reference to FIGS. 1-5. For example, FIG. 7 illustrates an embodiment of the texturing method 600 of FIG. 6 where the squeezing step 630 thereof includes additional sub-steps. Here, the squeezing step 630 includes the following steps (or sub-steps): positioning the electrodes on opposing sides of the tool 710 (or positioning the tool in between the electrode tips); locating the electrode tips to locations proximate to the textured surfaces that are disposed on each opposing side of the tool 720; moving the electrodes towards each other 730; squeezing the textured surfaces of the tool with the electrode tips 740; reversing the electrodes or moving the electrodes away from each other 750 to separate the electrode tips from the textured surfaces of the tool; and then re-positioning the electrodes away from the tool 760 (or removing the tool from in between the electrode tips). As described above, robotic welding equipment may be utilized. In such embodiments, some of the steps may be performed via a robotic welding arm such as, for example, the positioning step 710, the locating step 720, and the re-positioning step 760. In other embodiments, however, these and any other steps may be manually performed without robotic equipment.

After performing a number of welds, the electrode textures formed into the electrode tips will deteriorate and become worn out. In order to maintain a high quality weld, the electrodes occasionally may be reconditioned to provide a fresh or new electrode texture on the electrode tips. Electrodes having electrode textures as described herein have been shown to perform numerous welding operations without being reconditioned.

As previously mentioned, the shaping step 620 involves removing at least a portion of the worn out or deteriorated electrode tip that may include a worn out or deteriorated electrode texture. In some embodiments, a thin slice of the electrode tip may be removed using a tip dresser or some other method. Utilizing a tip dresser will provide the benefit of aligning the electrode tips before squeezing the pattern to the electrode tip surfaces. Moreover, the tip dresser provides an added benefit of cleaning any build-up of oxide or pitting from the electrode tip surfaces that may occur after the maximum number of welds permitted by the disclosed methods have been performed.

When shaping the electrode tips, the electrodes may be removed from the welding machine or may remain within the welding machine during squeezing of the pattern. For example, a robotic arm of the welding machine to which the electrodes are supported may articulate the electrodes to a location proximate to the tool, and then the electrode tips may be textured as detailed above, either one at a time or simultaneously.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A method of conditioning at least one electrode tip surface from: an upper electrode tip surface of an upper electrode, a lower electrode tip surface of a lower electrode, or a combination thereof, the method comprising:
    removing material from the at least one electrode tip surface to produce at least one new electrode tip surface from: a new upper electrode tip surface of the upper electrode, a new lower electrode tip surface of the lower electrode, or a combination thereof;
    placing a tool in proximity to the at least one new electrode tip surface, the tool having at least one surface from: an upper surface, a lower surface, or a combination thereof, wherein the at least one surface of the tool includes a textured surface, wherein the textured surface is harder than the at least one new electrode tip surface, the tool has a substantially uniform thickness;
    squeezing the at least one new electrode tip surface against the tool such that the at least one new electrode tip surface is squeezed against the textured surface, thereby imprinting the texture of the textured surface into the at least one new electrode tip surface; and reversing the squeezing action and removing the tool from contacting the at least one new electrode tip surface, wherein the new upper electrode tip surface and the new lower electrode tip surface are flat weld surfaces, and the tool is a plate, with the textured surface thereof being provided at portions of the at least one surface having geometries corresponding with the flat weld surfaces.

2. The method of claim 1, wherein the upper electrode and the lower electrode are supported by a welding machine, and wherein squeezing the at least one new electrode tip surface further comprises squeezing the at least one new electrode tip surface against the tool with the welding machine.

3. The method of claim 2, wherein the welding machine is a robotic or a stationary welding machine.

4. The method of claim 1, further comprising:
performing at least one welding operation with the at least one new electrode tip surface; and
re-squeezing the texture onto the at least one new electrode tip surface.

5. The method of claim 4, further comprising:
performing numerous welding operations with the at least one new electrode tip surface;
removing material from the at least one new electrode tip surface to produce at least one other new electrode tip surface from: another new upper electrode tip surface of the upper electrode, another new lower electrode tip surface of the lower electrode, or a combination thereof; and
placing the tool in proximity to the at least one other new electrode tip surface, such that the texture of the textured surface may be imprinted into the at least one other new electrode tip surface by squeezing the at least one other new electrode tip surface against the textured surface.

6. The method of claim 1, further comprising:
performing numerous welding operations with the at least one new electrode tip surface;
removing material from the at least one new electrode tip surface to produce at least one other new electrode tip surface from: another new upper electrode tip surface of the upper electrode, another new lower electrode tip surface of the lower electrode, or a combination thereof; and
placing the tool in proximity to the at least one other new electrode tip surface, such that the texture of the textured surface may be imprinted into the at least one other new electrode tip surface by squeezing the at least one other new electrode tip surface against the textured surface.

7. The method of claim 1, further comprising:
performing at least one welding operation with the at least one new electrode tip surface; and
depending on deterioration of the at least one new electrode tip surface:
re-squeezing the texture onto the at least one new electrode tip surface; or
removing material from the at least one new electrode tip surface to produce at least one other new electrode tip surface from: another new upper electrode tip surface of the upper electrode, another new lower electrode tip surface of the lower electrode, or a combination thereof, and then placing the tool in proximity to the at least one other new electrode tip surface, such that the texture of the textured surface may be imprinted into the at least one other new electrode tip surface by squeezing the at least one other new electrode tip surface against the textured surface.

8. The method of claim 1, wherein the textured surface of the tool is defined at one lateral end of the tool.

9. The method of claim 1, wherein a surface area of the textured surface is greater than a surface area of the at least one new electrode tip surface.

10. A method of reconditioning an upper electrode or a lower electrode, the method comprising:
shaping the upper electrode to expose an upper electrode tip surface;
shaping the lower electrode to expose a lower electrode tip surface;
placing a tool between the upper electrode tip surface and the lower electrode tip surface, the tool having an upper tool surface and a lower tool surface, a textured surface that is harder than the upper electrode tip surface and the lower electrode tip surface, wherein the tool has a substantially uniform thickness;
squeezing the tool between the upper electrode and the lower electrode such that the upper electrode tip surface is pressed against the textured surface of the upper tool surface and the lower electrode tip surface is pressed against the textured surface of the lower tool surface; and
displacing material on the upper electrode tip surface or the lower electrode tip surface to form a texture thereon that corresponds to the textured surface,
wherein the upper and lower electrode tip surfaces are flat weld surfaces, and the tool is a plate, with the textured surface thereof being provided at portions of the tool having geometries corresponding with the flat weld surfaces.

11. The method of claim 10, further comprising reversing the squeezing and removing the tool from between the upper electrode and the lower electrode.

12. The method of claim 10, wherein, prior to the shaping the upper electrode to expose the upper electrode tip surface and the shaping the lower electrode to expose the lower electrode tip surface, the method further includes:
performing numerous welding operations with at least one electrode from: the upper electrode, the lower electrode, or a combination thereof.

13. The method of claim 10, wherein the textured surface of the tool is defined at one lateral end of the tool.

14. The method of claim 13, wherein a surface area of the textured surface of the upper tool surface is greater than a surface area of the upper electrode tip surface, or wherein a surface area of the textured surface of the lower tool surface is greater than a surface area of the lower electrode tip surface.

15. A method of reconditioning a tip surface of a first electrode, the method comprising:
removing the tip surface of the first electrode to expose a new tip surface of the first electrode;
placing a tool proximate to the new tip surface of the first electrode, the tool having at least a first tool surface that includes a textured surface that is harder than the new tip surface, wherein the tool has a substantially uniform thickness;
squeezing the new tip surface against the textured surface; and
squeezing a texture of the textured surface into the new tip surface of the first electrode, wherein the new tip surface is a flat weld surface, and the tool is a plate, with the textured surface thereof being provided at portions of the tool having geometries corresponding with the flat weld surface.

16. The method of claim 15, further comprising performing numerous weld operations with the first electrode before removing the tip surface of the first electrode.

17. The method of claim 15, further comprising reversing the squeezing and removing the tool from between the first electrode and a second electrode.

18. The method of claim 15, wherein the textured surface is defined on the first tool surface at a lateral end of the tool, and wherein a surface area of the textured surface is greater than a surface area of the new tip surface of the first electrode.

* * * * *